United States Patent [19]

Kaufholz, Jr.

[11] 3,821,809

[45] June 28, 1974

[54] CARTRIDGE OPENER DEVICE

[75] Inventor: Frank H. Kaufholz, Jr., Havertown, Pa.

[73] Assignee: Computer Peripherals, Inc., Edina, Minn.

[22] Filed: June 7, 1973

[21] Appl. No.: 368,039

[52] U.S. Cl. .......................... 360/95, 226/89, 242/199

[51] Int. Cl. .......................... G11b 23/04, G11b 15/60

[58] Field of Search ................ 179/100.2 Z; 226/89; 242/199, 194

[56] References Cited

UNITED STATES PATENTS 3,208,682 9/1965 Pastor et al. ................ 179/100.2 Z

FOREIGN PATENTS OR APPLICATIONS 1,167,445 10/1969 Great Britain ............... 179/100.2 Z

*Primary Examiner*—Alfred H. Eddleman

*Attorney, Agent, or Firm*—J. T. Cavender; Wilbert Hawk, Jr.; Richard W. Lavin

[57] ABSTRACT

There is disclosed a tape cartridge opener which includes a rotatable member which when rotated through a predetermined angle will move the tape cartridge to an open position, an actuating mechanism for rotating and holding the rotatable member in said rotated position including a pressure actuated piston means for actuating said rotatable member, selectively operated latching means for positioning and holding the piston means in an actuated position and resilient means for returning the piston member to its home position upon release of the piston means by the latching means.

9 Claims, 5 Drawing Figures

CARTRIDGE OPENER DEVICE

BACKGROUND OF THE INVENTION

The present invention is directed to magnetic tape decks in which reels of tape are utilized for memory storage. In order to facilitate the handling of the tape reels, the reels are mounted in cartridges which also provide a dust-free environment. When the cartridges are mounted on the tape decks, mechanisms are provided to open the cartridges to allow the tape to be withdrawn from the reel usually by means of suction. Prior cartridge openers have utilized complex and costly mechanisms. It is therefor an object of this invention to provide a tape cartridge opener which is simple on operation and low in cost. It is a further object of this invention to provide a tape cartridge opener which can utilize an air pressure source since air pressure is used to remove the tape from the reel in the present embodiment.

SUMMARY OF THE INVENTION

In order to carry out these objects, there is provided a tape cartridge capable of being open by rotation of a pin through approximately 190°, a disc having a pin engaging the tape cartridge, a drive member engaging said disc, a pressure actuated piston engaging said drive member for rotating said drive member upon movement of the piston, a latching member movable into a position to latch the piston in an actuated position and resilient means engaging said piston for moving said piston to its home position.

DESCRIPTION OF A PREFERRED EMBODIMENT

Figure 1:
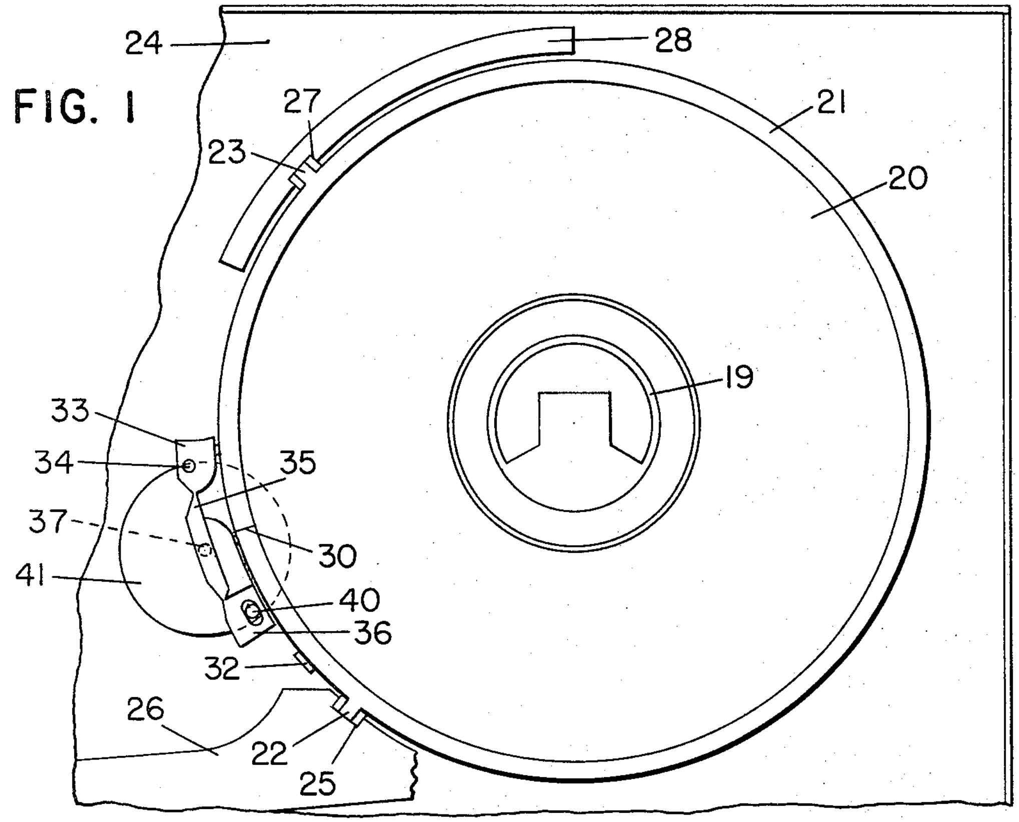
FIG. 1 is a front view of the tape cartridge showing the cartridge latch device in a closed position.
Figure 2:
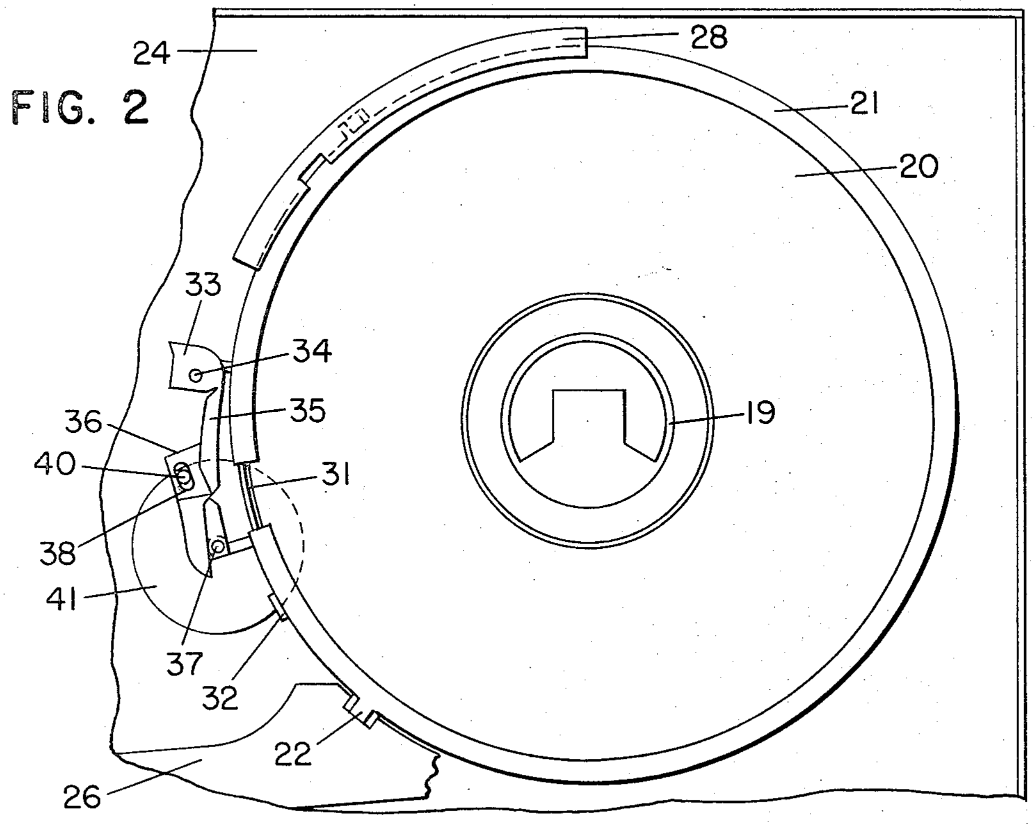
FIG. 2 is the same view as FIG. 1 showing the cartridge latch device in an open position.

Referring now to FIGS. 1 and 2, there is shown a tape cartridge including a tape reel 20, the cartridge comprising a rim 21 having a pair of projections 22, 23 located along its peripheral edge. When the cartridge is positioned on the hub 19 of a tape transport mechanism 24, the lower projection 22 is located within a slot 25 of a guide member 26 secured to the tape transport while the upper projection 23 is positioned within a slot 27 located in an arcuate hollow guide member 28 mounted on the tape transport, the projection 23 being capable of moving within the guide member 28 when actuated.

The rim 21 of the cartridge is made of a flexible plastic material and is split along the line 30 (FIG. 1), the rim also including an interior raised guide member 31 (FIG. 2) which is secured to the upper portion of the rim 21 and which overlaps a part of the lower portion of the rim 21. That portion of the guide member 31 which extends from the line 30 in the rim downward past the projection 22 is slidably mounted within the rim by means of a stud 32 positioned within a slot (not shown) located in the peripheral edge of the rim 21. Rotatably secured to the upper and lower portion of the rim 21 is a latch extension assembly comprising a support member 33 rotatably mounted on a pin 34 secured to the upper portion of the rim 21 and a connecting portion 35 rotatably attached to the support member 33 and a latch member 36 rotatably mounted on a pin 37 secured to the lower portion of the rim 21.

Located within the latch 36 (FIG. 2) is a slot 38 within which is positioned a pin 40 mounted on a rotatable disc 41. The clockwise rotation of the disc 41 will allow the pin 40 to move the latch member from a closed position (FIG. 1) to an open position (FIG. 2). As the latch member 36 is rotated by the disc 41 to a fully open position, the rim 21 will be forced to expand. Since the lower portion of the rim is mounted within the guide 26, the upper portion of the rim 21 will move outwardly within the confines of the hollow guide 28. In this position, the tape on the reel 20 will be removed from the reel through a slot (not shown) in the lower peripheral edge of the rim 21 by means of air pressure.

Figures 3, 4, 5:
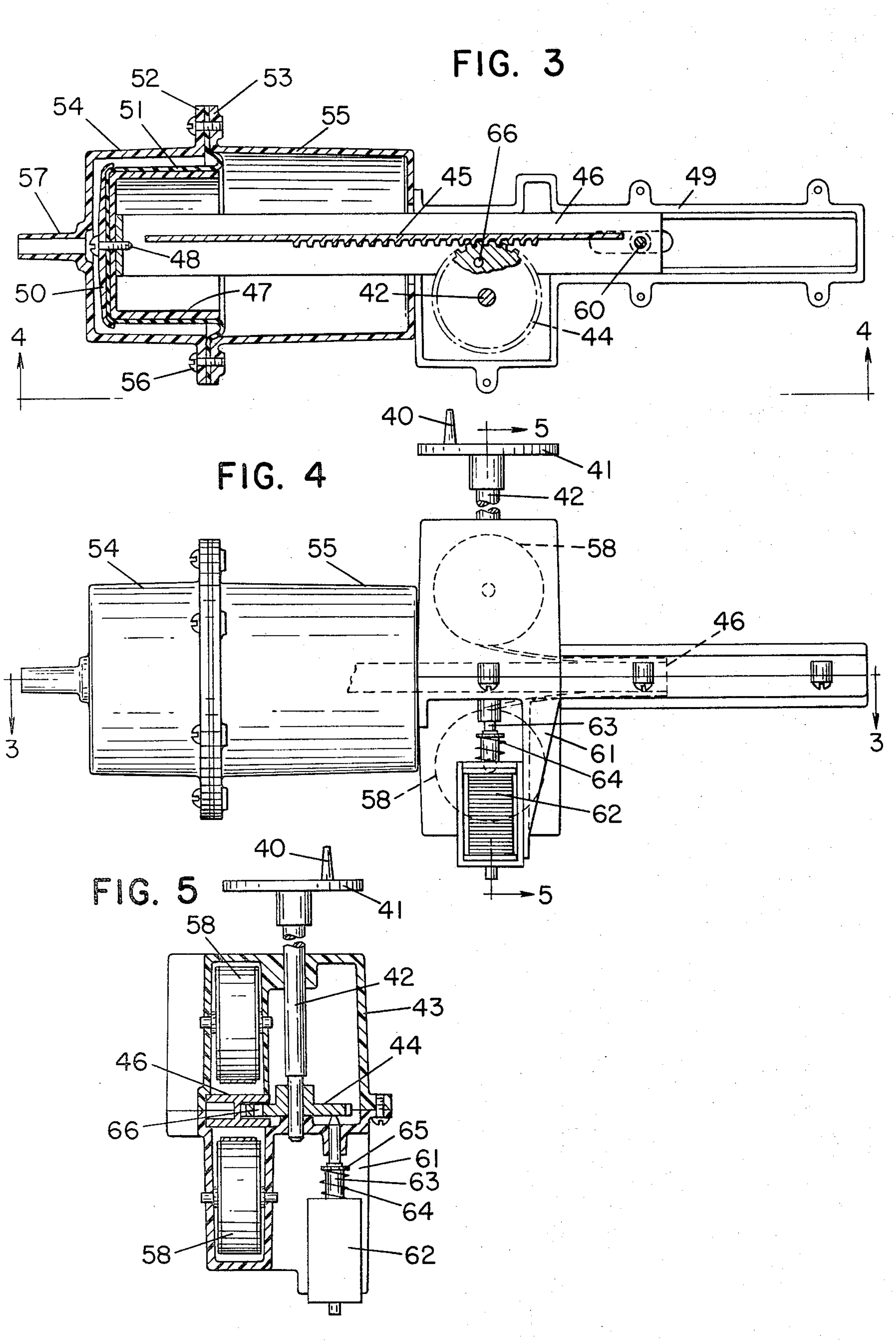
FIG. 3 is a cross-sectional view of the cartridge opener taken on line 3—3 of FIG. 4.
FIG. 4 is a bottom view of the cartridge opener taken on lines 4—4 of FIG. 3.
FIG. 5 is a sectional view of the cartridge opener taken on lines 5—5 of FIG. 4 showing details of the return springs and the latch pin.

As shown in FIGS. 4 and 5, the disc 41 is secured to a shaft 42 journaled in a housing 43. The other end of the shaft 42 is secured to a gear member 44 (FIGS. 3 and 5) which is engaged by a rack member 45 mounted within the open end of a piston rod 46. The piston rod 46 is secured to the end of a hollow piston 47 by means of a screw 48 and is slidably mounted within a rear housing 49. Also secured to the piston 47 by means of screw 48 is a cap 50 which secures a rubber diaphragm 51 to the piston. The diaphragm 51 is positioned between a pair of flange members 52, 53 to provide an air-tight chamber within an outer cylinder 54. The flange 53 is a part of a rear cylinder 55 and is attached to the flange 52 by means of screws 56. The front of the cylinder 54 has an inlet tube portion 57 which, as will be described more fully hereinafter, is connected to an air pressure source.

As shown more clearly in FIGS. 4 and 5 rotatably mounted within the housing 43 are a pair of spool-mounted spiral constant force springs 58 each having one end secured to the piston 46 by means of screws 60. Mounted on a support portion 61 of the housing 43 is a solenoid 62, whose armature 63 is normally urged in an outward direction by the compression spring 64 acting against a flange 65 mounted on the armature 63. The end of the armature is formed into a pointed end and is urged against the gear member 44 by the spring 64.

In operation of the cartridge opener, air pressure is supplied to the inlet 57 of the cylinder 54 which air pressure will move the piston 47 and the piston rod 46 to the right as viewed in FIG. 3. The movement of the piston rod 46 is against the action of the springs 58. As the piston rod moves to the right, the rack 45 will rotate the gear member 44 until an aperture 66 in the gear member is positioned adjacent the pointed head of the armature 63 allowing the spring 64 to move the armature into the aperture 66 thereby stopping the gear member and the piston rod. This movement of the gear member is approximately 193° which is transmitted by shaft 42 to the disc 41 resulting in the pin 40 rotating the latch member 36 to the open position shown in FIG. 2. When the tape cartridge is to be changed, the solenoid 62 will be actuated thereby withdrawing the armature 63 from the gear member 44. At this time, the air pressure in the inlet 57 has been eliminated. Upon the withdrawing of the armature 63 from the gear member 44, the springs 58 will return the piston rod 46 and the piston 47 to their home position as shown in FIG. 3.

It will be seen from this construction that there is provided a cartridge opener which is quick acting and positive in its operation. The action of the spring actuated armature on the gear member allows for the disc 41 to be held in an activated position for any length of time without affecting the efficiency of the drive system.

What is claimed is:

1. In a tape reel cartridge assembly having a latch member normally latching the cartridge in a closed position, said latch member mounted for rotatable movement to a position disengaging the cartridge from the tape reel, a cartridge opener for rotating the latch member to an open position including a. a rotatably mounted disc member positioned adjacent said latch member;

b. a drive member secured to said disc member and engaging said latch member;

c. a gear member having an aperture therein;

d. means interconnecting said disc member and said gear member;

e. a slidably mounted support member;

f. a rack member mounted on said support member and engaging said gear member;

g. a fluid pressure drive member engaging said support member for moving, when operated, said support member whereby said rack member will rotate said gear member and said disc member thereby moving the latch member towards an open position;

h. a movable stop member positioned adjacent said gear member;

i. and first resilient means engaging said stop member for normally urging said stop member into engagement with said gear member in line with said aperture whereby upon the stop member sensing said aperture, said resilient means will move said stop member into said aperture thereby stopping said gear member and said disc member.

2. The cartridge opener of claim 1 which includes a. an electromagnetic means engaging said stop member for disengaging said stop member from said aperture when energized;

b. and second resilient means engaging said support member for normally urging said support member toward its home position whereby upon the energizing of said electromagnetic means, said stop member is disengaged from said aperture thereby allowing said second resilient means to move said support member and the latch member to their home positions.

3. The cartridge opener of claim 2 in which said second resilient means comprises a pair of constant force springs rotatably mounted adjacent said support member each having one end secured to said support member.

4. In a tape reel cartridge having a latch member rotatable between a closed and open position for disengaging the cartridge from the tape reel, a cartridge opener for rotating the latch member between an open and closed position including a. a disc member rotatably mounted adjacent the latch member;

b. means mounted on said disc member engaging the latch member;

c. gear means secured to said disc member, said gear means having a stopping surface thereon;

d. drive means engaging said gear means for activating said gear means a predetermined distance whereby said disc member will rotate the latch member between an open and closed position;

e. and a selectively operated stop member engaging said gear means for intercepting said stopping surface after said gear means has moved through a predetermined distance whereby said gear means and said disc member are stopped to position the latch members in an open position.

5. The cartridge opener of claim 4 in which said drive means includes a. a slidably mounted support member positioned adjacent said gear means;

b. a rack member secured to said support member and engaging said gear means; and c. a selectively operated actuating member secured to said support member for moving said support member in a direction, when operated, whereby the gear means and the disc member will be rotated to move the latch member between an open and closed position.

6. The cartridge opener of claim 5 which includes a. a cylinder housing mounted adjacent said support member;

b. said actuating member comprises a piston member positioned within said housing and secured to said support member;

c. a flexible diaphragm secured to said housing and said piston member for forming an air-tight compartment with a portion of said cylinder housing; and d. means for introducing air pressure to said compartment whereby said piston member and said support member will be moved in a direction to move the latch member from a closed to an open position.

7. The cartridge opener of claim 5 which includes a plurality of first resilient means secured to said support member for normally urging said support member to a position closing said latch member.

8. The cartridge opener of claim 7 in which said first resilient means comprises constant force springs rotatably mounted adjacent said support member and each having one end secured to said support member.

9. The cartridge opener of claim 7 in which a. said selectively operated stop member comprises the end portion of the plunger of a solenoid;

b. second resilient means engaging said end portion for normally urging said end portion into engagement with said gear means;

c. and said stopping surface comprises an aperture positioned adjacent said end portion whereby during rotation of said gear means, said second resilient means will move the end portion of the plunger into the aperture thereby stopping the rotation of said gear means.

* * * * *